United States Patent
Jo et al.

(10) Patent No.: US 9,495,978 B2
(45) Date of Patent: Nov. 15, 2016

(54) METHOD AND DEVICE FOR PROCESSING A SOUND SIGNAL

(71) Applicant: SAMSUNG ELECTRONICS CO., LTD., Suwon-si (KR)

(72) Inventors: Seok-hwan Jo, Suwon-si (KR); Do-hyung Kim, Hwaseong-si (KR); Jae-hyun Kim, Seoul (KR); Shi-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/959,580

(22) Filed: Dec. 4, 2015

(65) Prior Publication Data
US 2016/0163335 A1    Jun. 9, 2016

(30) Foreign Application Priority Data

Dec. 4, 2014    (KR) .................. 10-2014-0173242

(51) Int. Cl.
*G10L 21/00* (2013.01)
*G10L 25/93* (2013.01)
*G10L 15/30* (2013.01)
*G10L 15/28* (2013.01)

(52) U.S. Cl.
CPC ............. *G10L 25/93* (2013.01); *G10L 15/285* (2013.01); *G10L 15/30* (2013.01)

(58) Field of Classification Search
CPC ............... G10L 21/0232; G10L 19/02; G10L 19/0212; G10L 19/022; G10L 15/02; G10L 21/04; G10L 21/14; G10L 21/0272; G10L 21/028; G10L 21/0332
See application file for complete search history.

(56) References Cited

U.S. PATENT DOCUMENTS

| | | | | |
|---|---|---|---|---|
| 5,111,505 A | * | 5/1992 | Kitoh | ............... G10L 13/06 704/265 |
| 6,384,759 B2 | * | 5/2002 | Snyder | ............... G10L 19/26 341/123 |
| 7,917,358 B2 | * | 3/2011 | Rogers | ............... G10L 19/025 381/94.1 |

(Continued)

FOREIGN PATENT DOCUMENTS

| JP | 2012-185861 A | 9/2012 |
|---|---|---|
| JP | 2013-077172 A | 4/2013 |

(Continued)

OTHER PUBLICATIONS

Bhattacharjee, "A Comparative Study of LPCC and MFCC Features for the Recognition of Assamese Phonemes", International Journal of Engineering Research & Technology, Jan. 2013, vol. 2, Is. 1, 6 pages total.

(Continued)

*Primary Examiner* — Edgar Guerra-Erazo
(74) *Attorney, Agent, or Firm* — Sughrue Mion, PLLC

(57) ABSTRACT

A method of processing a sound signal is disclosed. The method of processing a sound signal includes receiving a sound signal from the outside of a device, converting the sound signal into a first frequency domain signal, determining whether or not the sound signal is a voice signal using the first frequency domain signal acquired through the conversion, converting the first frequency domain signal into a second frequency domain signal based on the determination, and recognizing the sound signal using the second frequency domain signal acquired through the conversion.

20 Claims, 11 Drawing Sheets

(56) References Cited

U.S. PATENT DOCUMENTS

| | | |
|---|---|---|
| 8,463,610 B1 | 6/2013 | Bourke et al. |
| 2005/0219081 A1* | 10/2005 | Lee ................. G11B 20/10009 341/61 |
| 2006/0273938 A1* | 12/2006 | Van Den Enden ........................ H03H 17/0685 341/61 |
| 2007/0016407 A1* | 1/2007 | Sato ...................... G10L 19/018 704/205 |
| 2007/0078541 A1* | 4/2007 | Rogers ................. G10L 19/025 700/94 |
| 2012/0215537 A1 | 8/2012 | Igarashi |
| 2013/0090934 A1 | 4/2013 | Nagel et al. |
| 2013/0096930 A1 | 4/2013 | Neuendorf et al. |
| 2013/0246071 A1 | 9/2013 | Lee et al. |
| 2015/0221322 A1* | 8/2015 | Iyengar ................... G10L 25/84 704/226 |

FOREIGN PATENT DOCUMENTS

| | | |
|---|---|---|
| KR | 10-2012-0066561 A | 6/2012 |
| KR | 10-2013-0105219 A | 9/2013 |

OTHER PUBLICATIONS

Ramirez, et al.; "Voice Activity Detection. Fundamentals and Speech Recognition System Robustness", Robust Speech Recognition and Understanding, Jun. 2007, 23 pages total.

* cited by examiner

METHOD AND DEVICE FOR PROCESSING A SOUND SIGNAL

CROSS-REFERENCE TO RELATED APPLICATIONS

This application claims priority from Korean Patent Application No. 10-2014-0173242, filed on Dec. 4, 2014, in the Korean Intellectual Property Office, the disclosure of which is incorporated herein in its entirety by reference.

BACKGROUND

1. Field

The present disclosure relates to methods and apparatuses for processing a sound signal.

2. Description of the Related Art

With the development of information and communications technology, technology for processing a sound signal is being improved. In particular, a wearable device and always-on sensing technology are attracting attention in connection with a method of processing a sound signal.

In particular, in connection with a method of processing a voice signal, the always-on sensing technology is generally necessary to perform an operation of a device through a voice command. Also, in connection with an operation of a wearable device, it is generally necessary to perform the operation through a voice command.

However, a low-power driving method is generally necessary to implement the always-on sensing technology in combination with a wearable device.

SUMMARY

Provided is a device capable of efficiently performing an operation of processing a sound signal by performing a conversion of the sound signal in the frequency domain.

Additional aspects will be set forth in part in the description which follows and, in part, will be apparent from the description, or may be learned by practice of the presented exemplary embodiments.

According to a first aspect of an exemplary embodiment, a method of processing a sound signal includes: receiving a sound signal from an outside of a device; converting the sound signal into a signal in a first frequency domain, and determining whether or not the sound signal is a voice signal using the first frequency domain signal acquired through the conversion; converting the first frequency domain signal into a signal in a second frequency domain based on the determination; and recognizing the sound signal using the second frequency domain signal acquired through the conversion.

The converting of the first frequency domain signal into the second frequency domain signal based on the determination may include converting the first frequency domain signal into the second frequency domain signal when the sound signal is a voice signal.

The converting of the first frequency domain signal into the second frequency domain signal based on the determination may include converting the first frequency domain signal into the second frequency domain signal using at least one method among upsampling, downsampling, interpolation, mirroring, and phase shifting.

The first frequency domain may include at least one selected from a discrete Fourier transform (DFT) domain, a discrete cosine transform (DCT) domain, a discrete sine transform (DST) domain, and a modified discrete cosine transform (MDCT) domain.

The second frequency domain may include at least one selected from a DFT domain, a DCT domain, a DST domain, and an MDCT domain.

The converting of the first frequency domain signal into the second frequency domain signal based on the determination may include: storing the first frequency domain signal in an internal memory included in the device; and converting the stored first frequency domain signal into the second frequency domain signal.

The converting of the first frequency domain signal into the second frequency domain signal based on the determination may include: performing noise filtering on the first frequency domain signal; and converting the noise-filtered signal into the second frequency domain.

The recognizing of the voice signal using the second frequency domain signal acquired through the conversion may include recognizing the voice signal from the sound signal using an external memory included in the outside of the device.

According to a second aspect of another exemplary embodiment, a device includes: a signal receiver configured to receive a sound signal from an outside of the device; a voice signal determiner configured to convert the sound signal into a signal in a first frequency domain, and determine whether or not the sound signal is a voice signal using the first frequency domain signal acquired through the conversion; a frequency converter configured to convert the first frequency domain signal into a signal in a second frequency domain based on the determination; and a signal recognizer configured to recognize the sound signal using the second frequency domain signal acquired through the conversion.

The frequency converter may convert the first frequency domain signal into the second frequency domain signal when the sound signal is a voice signal.

The frequency converter may convert the first frequency domain signal into the second frequency domain signal using at least one method among upsampling, downsampling, interpolation, mirroring, and phase shifting.

The first frequency domain may include at least one selected from a DFT domain, a DCT domain, a DST domain, and an MDCT domain.

The second frequency domain may include at least one selected from a DFT domain, a DCT domain, a DST domain, and an MDCT domain.

The frequency converter may store the first frequency domain signal in an internal memory included in the device, and convert the stored first frequency domain signal into the second frequency domain signal.

The frequency converter may perform noise filtering on the first frequency domain signal, and convert the noise-filtered signal into the second frequency domain.

The signal recognizer may recognize the voice signal from the sound signal using an external memory included in the outside of the device.

According to a third aspect of another exemplary embodiment, a non-transitory computer-readable recording medium stores a program for causing a computer to perform the method of the first aspect.

According to a fourth aspect of another exemplary embodiment, a computer program is stored in a recording medium to implement the method of the first aspect.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
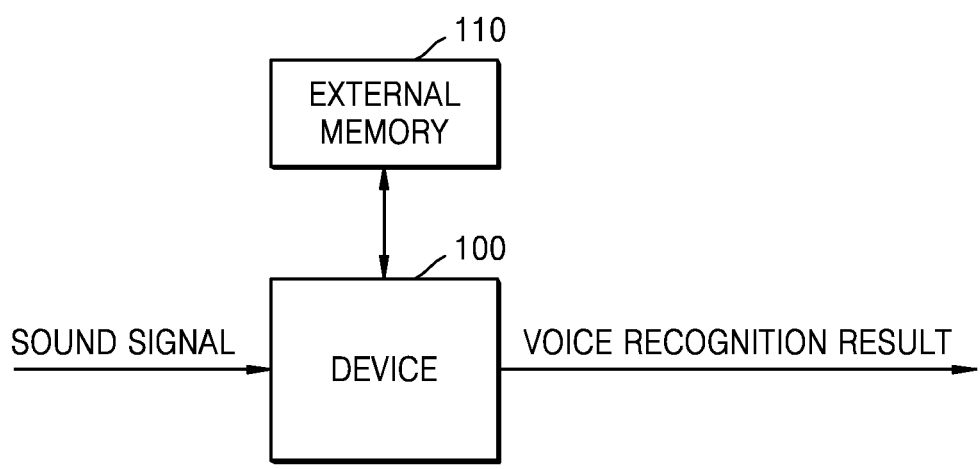
FIG. 1 is a diagram showing an example in which a device receives a signal and outputs a voice recognition result according to a variety of embodiments.

Merits and features of the present disclosure, and a method for accomplishing the merits and features will become apparent upon reference to the embodiments described below with the accompanying drawings. However, the present disclosure may be embodied in many different forms and should not be construed as being limited to the embodiments set forth herein. Rather, these embodiments are provided so that this disclosure will be thorough and complete, and will fully convey the concept of the disclosure to those of ordinary skill in the art. The scope of the disclosure is defined only by the claims.

Terminology used in this specification will be described in brief, and then the present disclosure will be described in detail.

As terminology used herein, general terms currently in wide use are selected wherever possible in consideration of functions in the present disclosure, but may vary according to intentions of those of ordinary skill in the art, precedent cases, the advent of new technology, and so on. In particular, some terms may be arbitrarily selected by the applicant, and in such cases, the detailed meanings of the terms will be stated in the corresponding description. Therefore, the terms used in this specification should be defined based on the meanings of the terms together with the description throughout the specification rather than their simple names.

Throughout the specification, when a portion "includes" an element, unless otherwise described, another element may be further included, rather than the presence of other elements being excluded. Also, terms such as "unit" and "portion" used herein represent software and hardware components, such as a field programmable gate array (FPGA) and an application-specific integrated circuit (ASIC), and a "unit" and a "portion" perform certain roles. However, a "unit" and a "portion" are not limited to software or hardware. A "unit" and a "portion" may be configured to reside on addressable storage media and configured to be executed on one or more processors. Therefore, examples of a "unit" and a "portion" may include components such as software components, object-oriented software components, class components, and task components, processes, functions, attributes, procedures, subroutines, segments of program code, drivers, firmware, microcode, circuitry, data, databases, data structures, tables, arrays, and variables. Functions provided in components and "units" may be combined into fewer components and "units" or further separated into additional components and "units."

In this specification, a singular expression includes a plural expression unless the context clearly indicates otherwise.

Hereinafter, embodiments will be described in detail with reference to the accompanying drawings. In the description with reference to the accompanying drawings, components that are identical or correspond to each other may be denoted by the same reference numeral, and the descriptions thereof may not be reiterated. Expressions such as "at least one selected from," when preceding a list of elements, modify the entire list of elements and do not modify the individual elements of the list.

FIG. 1 is a diagram showing an example in which a device 100 receives a signal and outputs a voice recognition result according to a variety of embodiments.

The device 100 according to an exemplary embodiment may receive a sound signal from an external source and output a voice recognition result. For example, the device 100 may determine whether or not the sound signal received from the external source is a voice signal, and output the voice recognition result when the received sound signal is a voice signal.

Also, the device 100 according to an exemplary embodiment may use an external memory 110 during a process of outputting the voice recognition result from the sound signal. For example, when the received sound signal is a voice signal, the device 100 may store the received sound signal in a preset form in the external memory 110, and may acquire the voice recognition result by analyzing the stored sound signal.

The device 100 according to an exemplary embodiment may perform always-on sensing for a sound signal to receive a sound signal. For example, power may be continuously applied to a microphone among sensors included in the device 100. When the microphone recognizes a signal, other modules included in the device 100 may be activated to operate. By continuously maintaining only the power of the microphone and activating other modules only when necessary, the device 100 according to an exemplary embodiment may reduce the overall power consumed by the device 100.

Figure 2:
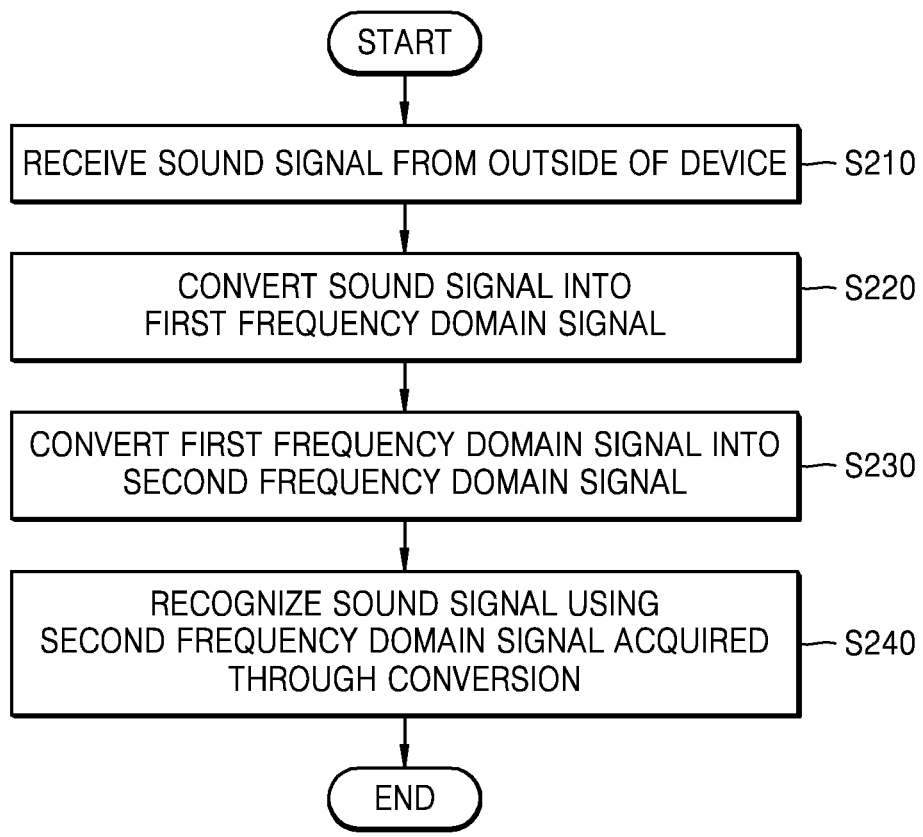
FIG. 2 is a flowchart illustrating a method in which a device receives a sound signal from an external source and recognizes the sound signal according to a variety of embodiments.

FIG. 2 is a flowchart illustrating a method in which the device 100 receives a sound signal from an external source and recognizes the sound signal according to a variety of embodiments.

In operation S210, the device 100 according to an exemplary embodiment receives a sound signal from the external source.

A sound signal according to an exemplary embodiment may represent a sound wave signal generated by the vibration of an object. The device 100 according to an exemplary embodiment may receive a sound signal generated external to the device 100 through a sensor included therein. For example, the device 100 may include a sound signal detection sensor. A sound signal detection sensor according to an exemplary embodiment may include a microphone.

For always-on sensing, power may be continuously applied to a sensor which receives a sound signal among sensors included in the device 100. For example, the microphone included in the device 100 may be continuously activated, and modules included in the device 100 other than the microphone may be activated in response to a voice signal being received by the microphone.

The device 100 according to an exemplary embodiment may receive a sound signal in units of preset lengths. For example, as one unit, the device 100 may process a sound signal received for a length preset within a range of about 10 ms to about 30 ms. In another example, with respect to a sound signal received from the external source, the device 100 may consider a first sound signal which is received for about the first 15 ms, a second sound signal which is received from about 15 ms to about 30 ms after the sound signal is initially received, and a third sound signal which is received from about 30 ms to about 45 ms after the sound signal is initially received as individual signals, and process the first sound signal to the third sound signal in sequence. However, the number disclosed in this specification is only one example of a preset value, and other values may be determined as the preset length.

In operation S220, the device 100 according to an exemplary embodiment converts the sound signal received in operation S210 into a first frequency domain signal.

The sound signal received by the device 100 according to an exemplary embodiment in operation S210 may be a time domain signal. The device 100 according to an exemplary embodiment may convert the sound signal provided as a time domain signal into a first frequency domain signal.

The first frequency domain signal according to an exemplary embodiment may represent a signal having a form expressible in a preset frequency domain. For example, the device 100 may convert the sound signal which is a time domain signal into a discrete Fourier transform (DFT) domain signal. In another example, the device 100 may convert the sound signal which is a time domain signal into a discrete cosine transform (DCT) domain signal. In still another example, the device 100 may convert the sound signal which is a time domain signal into a discrete sine transform (DST) domain signal. In yet another example, the device 100 may convert the sound signal which is a time domain signal into a modified discrete cosine transform (MDCT) domain signal.

The device 100 according to an exemplary embodiment may convert the sound signal into a first frequency domain signal in units of preset time lengths.

For example, the device 100 may convert the sound signal acquired in units of time lengths of about 30 ms into a first frequency domain signal. As an example, the device 100 may convert a fourth sound signal, which is a sound signal acquired between a point in time at which about 930 ms elapses after the device 100 starts operating and a point in time at which about 960 ms elapses after the device 100 starts operating, into a DFT domain signal. Here, the fourth sound signal may be a time domain signal.

The device 100 according to another embodiment may determine whether or not the sound signal is a voice signal using the received sound signal. For example, the device 100 may extract features from the received sound signal and analyze the extracted features to determine whether or not the received sound signal is a voice signal. In another example, the device 100 may analyze the frequency of the received sound signal to determine whether or not the received sound signal is a voice signal. In this specification, a feature may include an attribute.

The device 100 according to still another embodiment may convert the sound signal received in operation S210 into a first frequency domain signal, and determine whether or not the sound signal is a voice signal using the first frequency domain signal acquired through the conversion. For example, as described above, the device 100 may convert the received sound signal into a first frequency domain signal, analyze features of the first frequency domain signal acquired through the conversion, and determine whether or not the received sound signal is a voice signal according to the analysis result.

In operation S230, the device 100 according to an exemplary embodiment converts the first frequency domain signal into a second frequency domain signal based on the determination made in operation S220.

The device 100 according to an exemplary embodiment may convert the first frequency domain signal into a second frequency domain signal. For example, the device 100 directly converts the first frequency domain signal into a second frequency domain signal, and thus may process the sound signal in units of short time lengths. As an example, when the first frequency domain signal is directly converted into a second frequency domain signal without an intermediate process of converting the first frequency domain signal into the time domain, the device 100 may process the sound signal in units of time lengths of about 0.1 seconds or less. However, the time length of about 0.1 seconds used herein is only an example of the length of a sound signal, and other time lengths may be used. As another example, even when a voice command has a length of about two seconds, the device 100 may determine whether or not each of the sound signals obtained by dividing the sound signal having a length of about two seconds in units of time lengths of about 0.05 seconds is a voice signal.

The device 100 according to another embodiment may convert the first frequency domain signal into a second frequency domain signal when the sound signal is determined to be a voice signal. For example, the device 100 acquires the first frequency domain signal from the sound signal in operation S220, and may not convert the first frequency domain signal into a second frequency domain signal when the sound signal has been determined not to be a voice signal through the analysis of the first frequency domain signal. In another example, the device 100 acquires the first frequency domain signal from the sound signal in operation S220, and may convert the first frequency domain signal into a second frequency domain signal when the sound signal has been determined to be a voice signal through the analysis of the first frequency domain signal.

The device 100 according to still another embodiment may convert the first frequency domain signal into a second frequency domain signal using at least one method among upsampling, downsampling, interpolation, and mirroring.

For example, when the first frequency domain signal is a DFT domain signal and the second frequency domain signal is a DCT domain signal, the device 100 may acquire the second frequency domain signal by performing upsampling, interpolation, and phase shifting on the first frequency domain signal. The upsampling, interpolation, and phase shifting may be performed in a way that is adaptable to a domain transform.

In another example, when the first frequency domain signal is a DCT domain signal and the second frequency domain signal is a DFT domain signal, the device 100 may acquire the second frequency domain signal by performing downsampling, mirroring, and phase shifting on the first frequency domain signal. The downsampling, mirroring, and phase shifting may be performed in a way that is adaptable to a domain transform.

A detailed conversion method will be described later with reference to FIGS. 4 and 5.

The device 100 according to a further embodiment may store the first frequency domain signal in an internal memory included therein, and may convert the stored first frequency domain signal into a second frequency domain signal.

For example, the device 100 may convert the received sound signal into the first frequency domain signal and store the first frequency domain signal in the internal memory included therein. The data size of the converted first frequency domain signal may be small enough for the first frequency domain signal to be stored in the internal memory. As an example, the device 100 may convert the sound signal having a preset length into the first frequency domain signal and store the first frequency domain signal in the internal memory included therein. Here, the preset length according to an exemplary embodiment may be short enough, and the data size of the converted first frequency domain signal may be small enough, for the first frequency domain signal to be stored in the internal memory. For example, the preset length may be about 0.1 seconds or less. Since the device 100 according to an exemplary embodiment may control the data size of the first frequency domain signal to be a preset value or less as described above, it is possible to store the first frequency domain signal in the internal memory and process the stored first frequency domain signal. Since the device 100 may process the first frequency domain signal using the internal memory alone, it is possible to process the first frequency domain signal without accessing an external memory.

In another example, the device 100 may acquire a second frequency domain signal by performing a frequency conversion on the first frequency domain signal stored in the internal memory. The device 100 according to an exemplary embodiment may perform a frequency conversion on a signal stored in a memory. Therefore, in order for the device 100 to perform the frequency conversion, the first frequency domain signal may be stored in advance. The device 100 may acquire a second frequency domain signal by performing a frequency conversion on the first frequency domain signal stored in the internal memory.

The device 100 according to a still further embodiment may perform noise filtering on the first frequency domain signal, and may convert the noise-filtered signal into a second frequency domain.

For example, the device 100 may convert the sound signal into the first frequency domain signal, perform noise filtering on the first frequency domain signal acquired through the conversion, and perform a frequency conversion on the noise-filtered signal, thereby acquiring a second frequency domain signal. Since the noise filtering is performed on the first frequency domain signal, a noise filtering method suitable for the first frequency domain signal may be used.

The second frequency domain signal according to an exemplary embodiment may represent a signal having a form expressible in a preset frequency domain. For example, the device 100 may convert the first frequency domain signal into a DFT domain signal. In another example, the device 100 may convert the first frequency domain signal into a DCT domain signal. In still another example, the device 100 may convert the first frequency domain signal into a DST domain signal. In yet another example, the device 100 may convert the first frequency domain signal into an MDCT domain signal.

The amount of calculation necessary to convert the first frequency domain signal into a second frequency domain signal may be smaller than the amount of calculation necessary to convert the first frequency domain signal into a time domain signal and then acquire a second frequency domain signal from the time domain signal. Therefore, by directly converting the first frequency domain signal into a second frequency domain signal, the device 100 may reduce the necessary amount of calculation.

When the first frequency domain signal is a DFT frequency domain signal and the second frequency domain signal is a DCT frequency domain signal according to an exemplary embodiment, the first frequency domain signal and the second frequency domain signal may be expressed by [Equation 1] and [Equation 2], respectively.

$$Y'[k] = Re\{e^{-j\frac{\pi}{2N}k} X[k/2]\}, 0 \le k < N, \text{even} \quad [\text{Equation 1}]$$

$$Y'[k] = Re\{\frac{1}{2} e^{-i\frac{\pi}{2N}k} (X[(k-1)/2] + X[(k+1)/2])\}, \quad [\text{Equation 2}]$$
$$0 \le k < N, \text{odd}$$

When the first frequency domain signal is a DCT frequency domain signal and the second frequency domain signal is a DFT frequency domain signal according to another embodiment, the first frequency domain signal and the second frequency domain signal may be expressed by [Equation 3] and [Equation 4], respectively.

$$Y'[k] = e^{j\frac{\pi}{2N}k} X[2k], 0 \le k < N/2 \quad [\text{Equation 3}]$$

$$Y'[k] = -e^{j\frac{\pi}{2N}k} X[2N-2k], N/2 \le k < N \quad [\text{Equation 4}]$$

A DFT frequency domain signal according to an exemplary embodiment may be defined as [Equation 5], and in the case of a voice signal, a DCT frequency domain signal may be converted into a DFT frequency domain signal through downsampling and mirroring.

$$Y[k] = \sum_{n=0}^{N-1} x[n]e^{-j\frac{2\pi}{N}kn}, 0 \le k < N \quad [\text{Equation 5}]$$

A DCT frequency domain signal according to an exemplary embodiment may be defined as [Equation 6], and in the case of a voice signal, a DFT frequency domain signal may be converted into a DCT frequency domain signal through upsampling and interpolation.

$$Y[k] = \sum_{n=0}^{N-1} x[n]e^{-j\frac{2\pi}{2N}kn}, 0 \le k < N \quad [\text{Equation 6}]$$

In operation S240, the device 100 according to an exemplary embodiment recognizes the sound signal received in operation S210 using the second frequency domain signal acquired through the conversion.

The device 100 according to an exemplary embodiment may extract features of the second frequency domain signal by analyzing the second frequency domain signal, thereby recognizing a voice signal from the second frequency domain signal. The voice signal recognized from the second frequency domain signal may be a voice signal corresponding to the sound signal received in operation S210.

For example, when the sound signal received in operation S210 is determined to be a voice signal in operation S220, the device 100 may recognize the voice signal by extracting features of the second frequency domain signal. When the device 100 according to an exemplary embodiment performs a voice recognition operation, the device 100 may use a voice database. The voice database may represent a database in which data related to features of voice are collected. The device 100 according to an exemplary embodiment may recognize a voice signal corresponding to a sound signal by comparing the features of voice stored in the voice database with the analysis results of the second frequency domain signal. For example, when the sound signal is a voice signal corresponding to "Set my alarm," the device 100 may determine that features of the voice signal data "my alarm" stored in the voice database and features of the voice signal data "set" correspond to features of the received sound signal, and the device 100 may recognize that the received sound signal corresponds to a voice signal "Set my alarm." Also, the device 100 may transmit the voice recognition result to a receiver external to the device 100.

Figure 3:
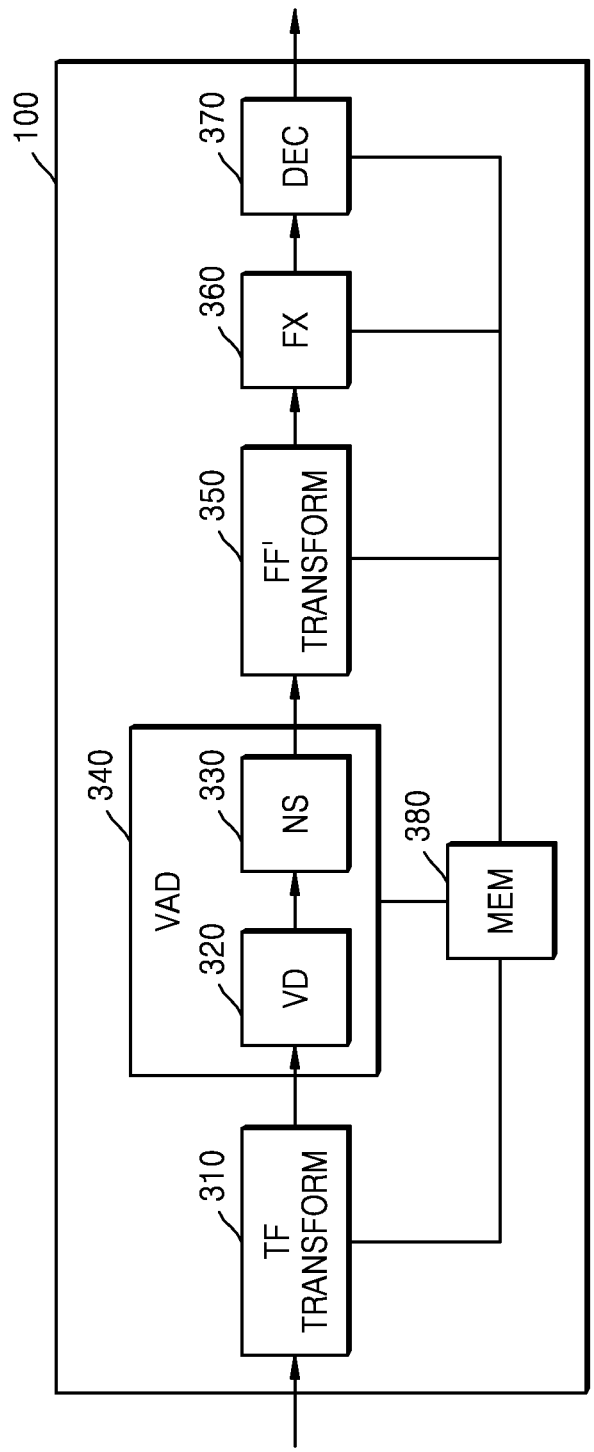
FIG. 3 is a diagram showing an example in which a device converts a sound signal and recognizes the converted sound signal according to a variety of embodiments.

FIG. 3 is a diagram showing an example in which the device 100 converts a sound signal and recognizes the converted sound signal according to a variety of embodiments.

Referring to FIG. 3, the device 100 according to an exemplary embodiment may include a first frequency converter 310, a voice activity detector (VAD) 340, a second frequency converter 350, a feature point extractor 360, a decoder 370, and an internal memory 380. Also, the VAD 340 according to an exemplary embodiment may include a voice recognizer 320 and a noise suppressor 330.

However, the device 100 may be implemented by more or fewer components than those shown in the drawing.

The first frequency converter 310 according to an exemplary embodiment may convert a time domain signal into a first frequency domain signal. For example, the first frequency converter 310 may convert a sound signal which is a time domain signal into a first frequency domain signal. As an example, the first frequency converter 310 may convert the sound signal which is a time domain signal into at least one selected from a DFT domain signal, a DCT domain signal, a DST domain signal, and an MDCT domain signal.

The data size of the sound signal converted by the first frequency converter 310 according to an exemplary embodiment may be controlled to be a preset value or less. For example, the length of the sound signal converted by the first frequency converter 310 may be a preset length or less. As an example, the length of the sound signal converted by the first frequency converter 310 may be 30 ms or less.

The VAD 340 according to an exemplary embodiment may include the voice recognizer 320 and the noise suppressor 330. The VAD 340 according to an exemplary embodiment may determine whether or not the sound signal received from the external source is voice. Power may be continuously applied to the VAD 340 according to an exemplary embodiment.

The voice recognizer 320 according to an exemplary embodiment may determine whether or not the input sound signal is a voice signal by analyzing the first frequency domain signal received from the first frequency converter 310.

The noise suppressor 330 according to an exemplary embodiment may remove noise from a signal received from the voice recognizer 320. The noise suppressor 330 according to an exemplary embodiment may operate when the voice recognizer 320 determines that the sound signal is a voice signal. For example, the noise suppressor 330 may not be activated when the voice recognizer 320 determines that the sound signal currently received from the voice recognizer 320 is not a voice signal, and may be activated later when a signal determined to be a voice signal by the voice recognizer 320 is received.

Also, the noise suppressor 330 according to an exemplary embodiment performs a noise suppression operation on the first frequency domain signal and thus may perform the noise suppression operation in an adaptive way to the first frequency domain signal.

The second frequency converter 350 according to an exemplary embodiment may convert a signal received from the VAD 340 into a second frequency domain signal.

For example, the second frequency converter 350 may convert the signal received from the VAD 340 into the second frequency domain signal based on a fast Fourier transform (FFT) calculation. For example, the first frequency converter 310 may convert the sound signal into a DFT domain signal, and the second frequency converter 350 may convert the signal received from the VAD 340 into a DCT domain signal. In this case, the VAD 340 may determine whether or not the sound signal is a voice signal using the DFT domain signal, and the feature point extractor 360 may extract feature points using the DCT domain signal. Both the VAD 340 and the second frequency converter 350 according to an exemplary embodiment may not process time domain signals but may process frequency domain signals.

In another example, when the frequency domain of the signal processed by the VAD 340 is the same as the frequency domain of the signal processed by the feature point extractor 360, the second frequency converter 350 may cause the signal received from the VAD 340 to bypass any intermediate process and be transferred to the feature point extractor 360. In this case, the second frequency converter 350 may perform the mathematical operation of an identity matrix.

The second frequency converter 350 according to an exemplary embodiment may store the signal received from the VAD 340 in the internal memory 380, and may acquire the second frequency domain signal by processing the signal stored in the internal memory 380. Since the data size of a first frequency domain signal may be controlled to be a preset value or less as described above with reference to FIG. 2, the device 100 may store the signal received from the VAD 340 in the internal memory 380 having a limited data size.

By performing a conversion in the form of a change of a frequency domain, the second frequency converter 350 according to an exemplary embodiment may reduce the amount of calculation and enable the device 100 to operate with low power overall.

The feature point extractor 360 according to an exemplary embodiment may extract feature points from the second frequency domain signal.

For example, the feature point extractor 360 may extract feature points from the second frequency domain signal acquired from the second frequency converter 350 and may transmit the feature points to the decoder 370.

The feature point extractor 360 according to an exemplary embodiment may operate subordinate to the operation of the VAD 340. For example, the feature point extractor 360 may be activated when the voice recognizer 320 determines that the input sound signal is a voice signal, and may be deactivated when the voice recognizer 320 determines that the input sound signal is not a voice signal.

Also, the feature point extractor 360 according to an exemplary embodiment may store data about the extracted feature points in the internal memory 380.

The decoder 370 according to an exemplary embodiment may recognize a voice signal using a signal received from the feature point extractor 360. For example, the decoder 370 may recognize the received voice signal by comparing the feature points extracted by the feature point extractor 360 with voice models stored in a database (not shown).

The internal memory 380 according to an exemplary embodiment may represent a storage space included in the device 100. Unlike an external memory, the internal memory 380 may have a limited data size. However, as mentioned above, the signal received from the VAD 340 or the data about the extracted feature points may be stored in the internal memory 380.

Figure 4:
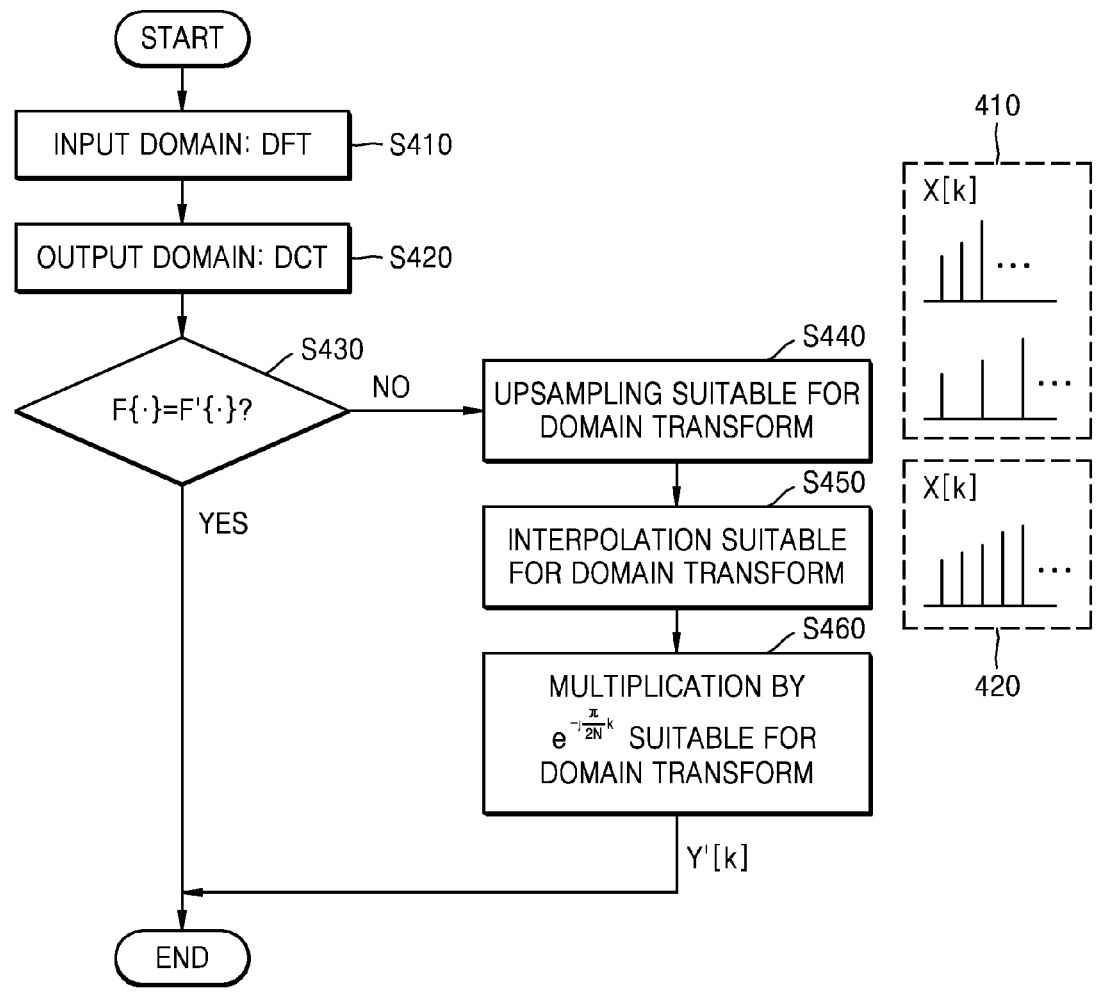
FIG. 4 is a flowchart illustrating a method in which a device converts a sound signal through upsampling according to a variety of embodiments.

FIG. 4 is a flowchart illustrating a method in which the device 100 converts a sound signal through upsampling according to a variety of embodiments.

In operation S410, the device 100 according to an exemplary embodiment may acquire a DFT domain signal as a pre-conversion signal. For example, the pre-conversion signal may represent the aforementioned first domain signal.

In operation S420, the device 100 according to an exemplary embodiment may acquire a DCT domain signal as a post-conversion signal. For example, the post-conversion signal may represent the aforementioned second domain signal.

In operation S430, the device 100 according to an exemplary embodiment may determine whether or not the pre-conversion signal and the post-conversion signal have the same frequency domain.

When the pre-conversion signal and the post-conversion signal have the same frequency domain, the conversion may not be performed but may be finished. For example, when the pre-conversion signal is a DFT domain signal and the post-conversion signal is also a DFT domain signal, the device 100 may finish the conversion process without converting the signal.

In operation S440, when the pre-conversion signal and the post-conversion signal do not have the same frequency domain, the device 100 according to an exemplary embodiment may perform upsampling suitable for the domain transform on the DFT domain signal which is the pre-conversion signal. As shown in a first graph 410, the device 100 may cause a pre-conversion value to correspond to a wider frequency domain by increasing the sampling frequency of the signal.

In operation S450, the device 100 according to an exemplary embodiment may perform interpolation suitable for the domain transform on the signal which has undergone upsampling in operation S440. As shown in a second graph 420, the device 100 may convert the signal by estimating and interpolating intermediate values between respective values.

In operation S460, the device 100 according to an exemplary embodiment may perform phase shifting suitable for the domain transform on the signal which has undergone interpolation in operation S450. The device 100 according to an exemplary embodiment may perform the phase shifting in consideration of a phase difference between reference frequencies occurring in a process of converting the DFT frequency domain signal into the DCT frequency domain signal.

The device 100 according to an exemplary embodiment may acquire a DCT frequency domain signal corresponding to the DFT frequency domain signal by performing upsampling, interpolation, and phase shifting on the DFT frequency domain signal in operation S440, operation S450, and operation S460, respectively.

Figure 5:
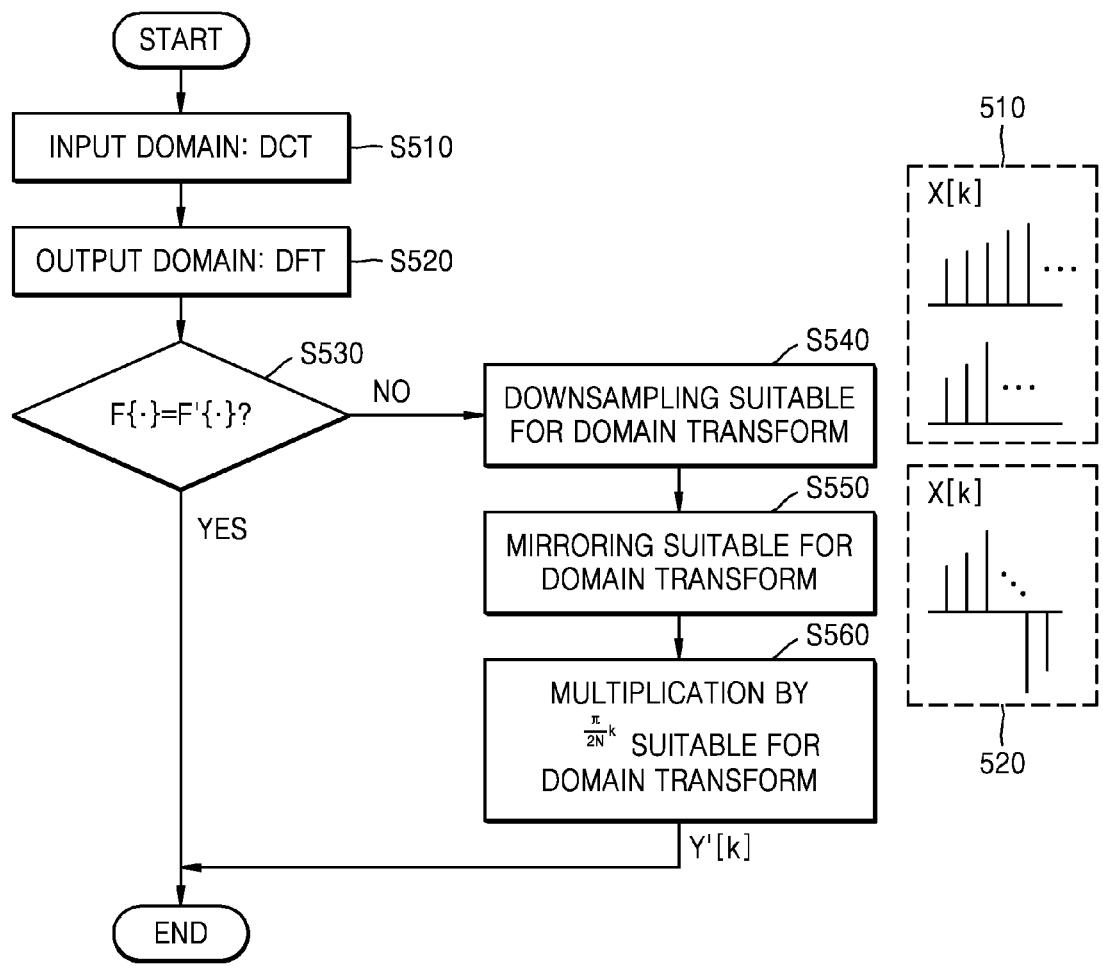
FIG. 5 is a flowchart illustrating a method in which a device converts a sound signal through downsampling according to a variety of embodiments.

FIG. 5 is a flowchart illustrating a method in which the device 100 converts a sound signal through downsampling according to a variety of embodiments.

In operation S510, the device 100 according to an exemplary embodiment may acquire a DCT domain signal as a pre-conversion signal. For example, the pre-conversion signal may represent the aforementioned first domain signal.

In operation S520, the device 100 according to an exemplary embodiment may acquire a DFT domain signal as a post-conversion signal. For example, the post-conversion signal may represent the aforementioned second domain signal.

In operation S530, the device 100 according to an exemplary embodiment may determine whether or not the pre-conversion signal and the post-conversion signal have the same frequency domain.

When the pre-conversion signal and the post-conversion signal have the same frequency domain, the conversion may not be performed but may be finished. For example, when the pre-conversion signal is a DCT domain signal and the post-conversion signal is also a DCT domain signal, the device 100 may finish the conversion process without converting the signal.

In operation S540, when the pre-conversion signal and the post-conversion signal do not have the same frequency domain, the device 100 according to an exemplary embodiment may perform downsampling suitable for the domain transform on the DCT domain signal which is the pre-conversion signal. As shown in a third graph 510, the device 100 may cause a pre-conversion value to correspond to a narrower frequency domain by reducing the sampling frequency of the signal.

In operation S550, the device 100 according to an exemplary embodiment may perform mirroring suitable for the domain transform on the signal which has undergone downsampling in operation S540. As shown in a fourth graph 520, the device 100 may convert the signal by performing mirroring on respective values.

In operation S560, the device 100 according to an exemplary embodiment may perform phase shifting suitable for the domain transform on the signal on which mirroring has been performed in operation S550. The device 100 according to an exemplary embodiment may perform the phase shifting in consideration of a phase difference between reference frequencies occurring in a process of converting the DCT frequency domain signal into the DFT frequency domain signal.

The device 100 according to an exemplary embodiment may acquire a DFT frequency domain signal corresponding to the DCT frequency domain signal by performing downsampling, mirroring, and phase shifting on the DCT frequency domain signal in operation S540, operation S550, and operation S560, respectively.

Figure 6:
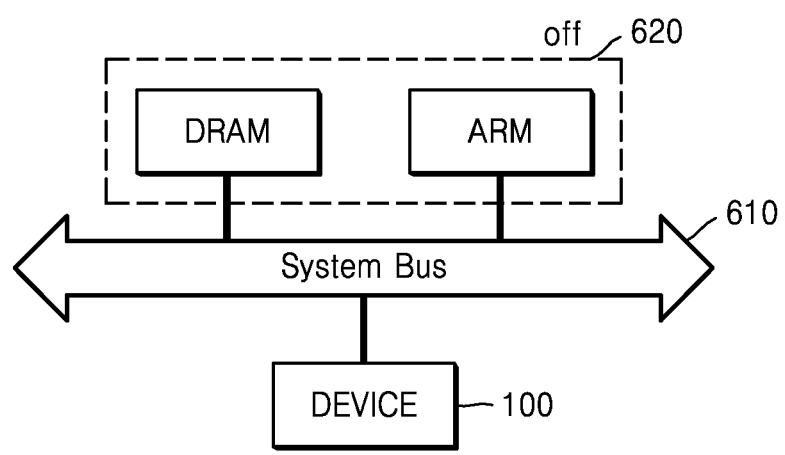
FIG. 6 is a diagram illustrating an example in which a device processes a sound signal according to a variety of embodiments.

FIG. 6 is a diagram illustrating an example in which the device 100 processes a sound signal according to a variety of embodiments.

The device 100 according to an exemplary embodiment may operate in connection with a system bus 610. An external device 620 may be connected to the system bus 610 and may come in a variety of forms. For example, the external device 620 according to an exemplary embodiment may include an external memory or an external processor.

As mentioned above with reference to FIG. 2 or 3, the device 100 according to an exemplary embodiment may use the internal memory included therein when performing a frequency conversion or storing data about feature points. Therefore, the device 100 according to an exemplary embodiment may operate when the external device 620 is in a deactivated state. For example, when the device 100 performs an operation of determining whether or not a sound signal is a voice signal and an operation of converting a first frequency domain signal into a second frequency domain signal, the external device 620 may be deactivated.

Figure 7:
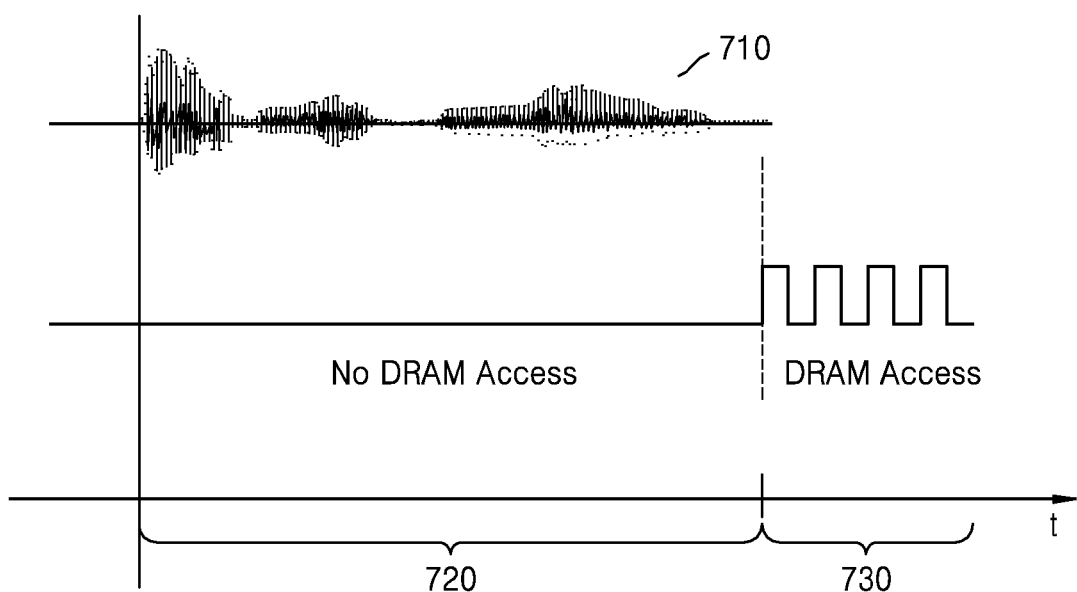
FIG. 7 is a diagram illustrating an example in which a device processes a sound signal using a memory according to a variety of embodiments.

FIG. 7 is a diagram illustrating an example in which the device 100 processes a sound signal using a memory according to a variety of embodiments.

The device 100 according to an exemplary embodiment may receive a sound signal 710 from an external source.

Also, the device 100 according to an exemplary embodiment may perform an operation of determining whether or not the received sound signal 710 is a voice signal and an operation of converting the sound signal during a first time period 720.

When the sound signal 710 is not received, the device 100 according to another embodiment may perform a voice recognition operation for the sound signal 710 received in the first time period 720 during a second time period 730. The device 100 according to an exemplary embodiment may operate without using an external memory in the first time period 720, but may operate using an external memory in the second time period 730.

For example, the device 100 receives the sound signal 710 in the first time period 720, and may not perform a voice recognition operation. Therefore, without accessing an external memory, the device 100 performs the operation of determining whether or not the received sound signal 710 is a voice signal and the frequency conversion operation in the first time period 720. In the second time period 730, reception of the sound signal 710 has been finished, and thus the device 100 may perform a voice recognition operation for the received sound signal 710 using an external memory.

Figure 8A:
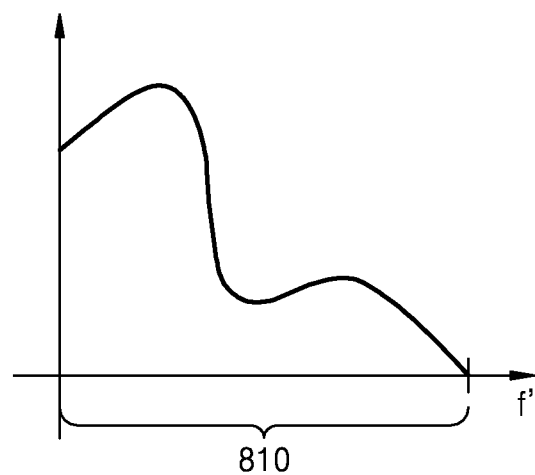
FIGS. 8A and 8B are diagrams illustrating a method in which a device converts a sound signal according to a variety of embodiments.
Figure 8B:
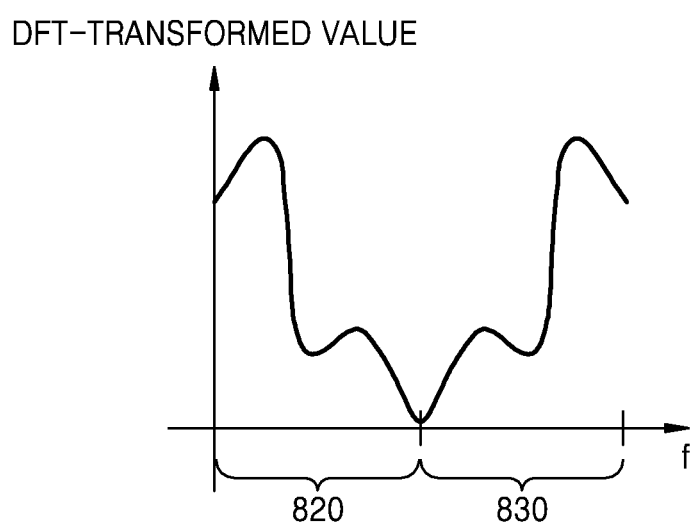

FIGS. 8A and 8B are diagrams illustrating a method in which the device 100 converts a sound signal according to a variety of embodiments.

A DCT frequency domain signal according to an exemplary embodiment is shown in FIG. 8A. Also, a DFT frequency domain signal corresponding to the DCT frequency domain signal shown in FIG. 8A is shown in FIG. 8B.

When the DCT frequency domain signal shown in FIG. 8A is a first signal and the DFT domain signal shown in FIG. 8B is a second signal, the device 100 according to an exemplary embodiment may acquire the second signal by performing a frequency conversion on the first signal.

For example, as described above with reference to FIG. 5, the device 100 may acquire the second signal through downsampling, mirroring, and phase shifting of the first signal. By downsampling the first signal with respect to a first period 810, it is possible to acquire the second signal of a second period 820, and by performing mirroring on the second signal of the second period 820, it is possible to acquire the second signal of a third period 830. Also, by performing phase shifting, it is possible to acquire the second signal in the second period 820 and the third period 830 overall.

The device 100 according to another embodiment may acquire the first signal by performing a frequency conversion on the second signal.

For example, as described above with reference to FIG. 4, the device 100 may acquire the first signal through upsampling, interpolation, and phase shifting of the second signal. By upsampling and interpolating the second signal with respect to the second period 820, it is possible to acquire the first signal of the first period 810. Also, by performing phase shifting, it is possible to acquire the first signal in the first period 810.

The device 100 may be set so that the signal conversion disclosed in FIGS. 8A and 8B is performed only when a received signal is a voice signal.

Figure 9:
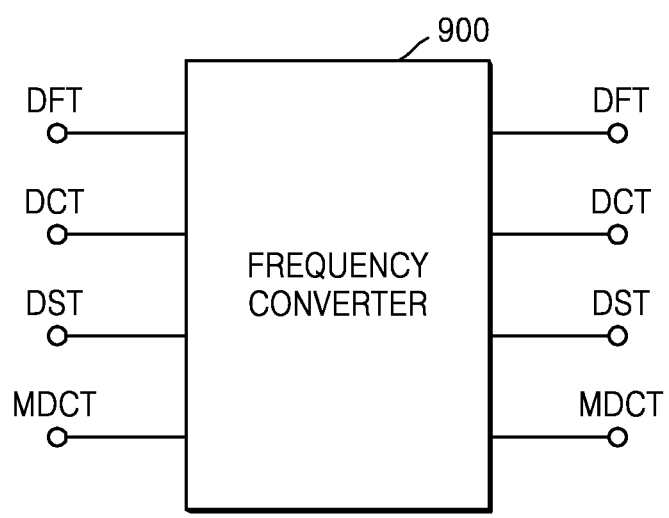
FIG. 9 is a diagram illustrating a method in which a frequency converter transforms the frequency domain of a signal according to a variety of embodiments.

FIG. 9 is a diagram illustrating a method in which a frequency converter 900 transforms the frequency domain of a signal according to a variety of embodiments.

The frequency converter 900 according to an exemplary embodiment may convert a first frequency domain signal into a second frequency domain signal. For example, the frequency converter 900 may convert a first frequency domain signal input from a left terminal thereof into a second frequency domain signal output from a right terminal thereof.

For example, the frequency converter 900 may convert one of a DFT domain signal, a DCT domain signal, a DST domain signal, and an MDCT domain signal into one of a DFT domain signal, a DCT domain signal, a DST domain signal, and an MDCT domain signal.

As an example, the frequency converter 900 may convert a DFT signal into a DCT domain signal. As another example, the frequency converter 900 may convert a DCT signal into a DFT domain signal.

In another example, when the first frequency domain signal and the second frequency domain signal have the same frequency domain, the frequency converter 900 may cause the received signal to bypass any intermediate process as an output signal. In this case, the frequency converter 900 may perform the mathematical operation of an identity matrix.

Figure 10:
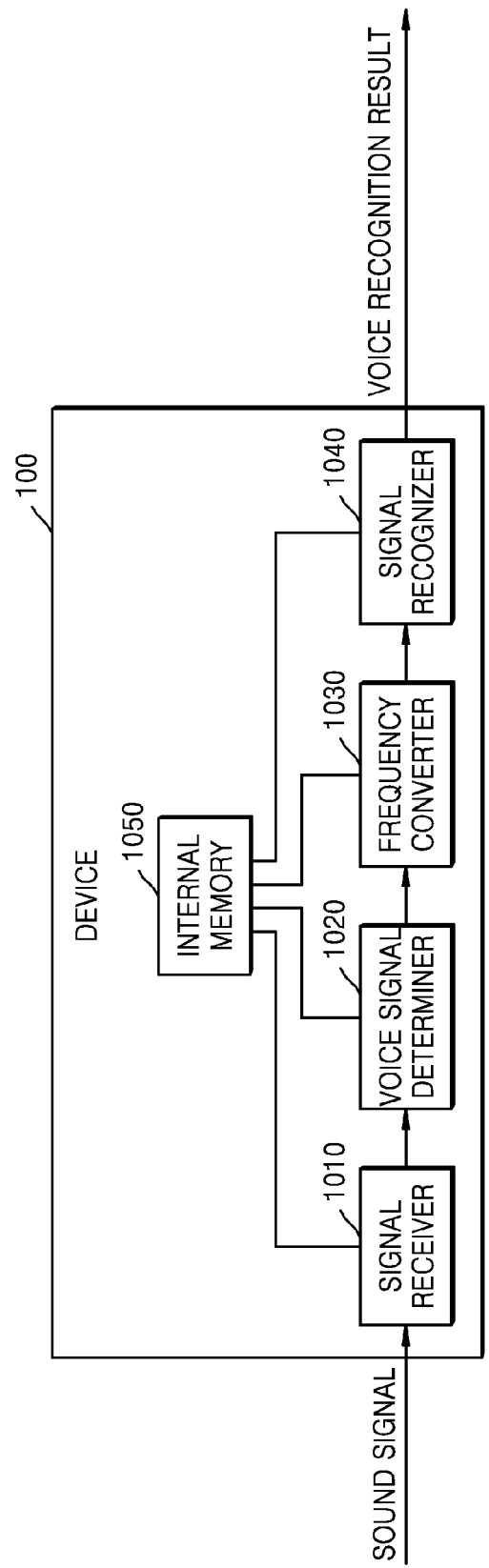
FIG. 10 is a block diagram showing a configuration of a device according to a variety of embodiments.

FIG. 10 is a block diagram showing a configuration of the device 100 according to a variety of embodiments.

As shown in FIG. 10, the device 100 may include a signal receiver 1010, a voice signal determiner 1020, a frequency converter 1030, a signal recognizer 1040, and an internal memory 1050. However, the device 100 may be implemented by more or fewer components than those shown in the drawing.

The above components will be described in sequence below.

The signal receiver 1010 according to an exemplary embodiment receives a sound signal from a source external to the device 100.

The sound signal according to an exemplary embodiment may represent a sound wave signal generated by the vibration of an object. The signal receiver 1010 according to an exemplary embodiment may receive a sound signal generated external to the device 100 through a sensor included therein. For example, the signal receiver 1010 may include a sound signal detection sensor. A sound signal detection sensor according to an exemplary embodiment may include a microphone.

For always-on sensing, power may be continuously applied to a sensor which receives a sound signal among sensors included in the signal receiver 1010. For example, the microphone included in the signal receiver 1010 may be continuously activated, and modules included in the signal receiver 1010 other than the microphone may be activated in response to a voice signal being received by the microphone.

The signal receiver 1010 according to an exemplary embodiment may receive a sound signal in units of preset lengths. For example, as one unit, the signal receiver 1010 may process a sound signal received for a length preset within a range of about 10 ms to about 30 ms. In another example, with respect to a sound signal received from an external source, the signal receiver 1010 may consider a first sound signal which is received for about the first 15 ms, a second sound signal which is received from about 15 ms to about 30 ms after the sound signal is initially received, and a third sound signal which is received from about 30 ms to about 45 ms after the sound signal is initially received as individual signals, and process the first sound signal to the third sound signal in sequence. However, the number disclosed in this specification is only one example of a preset value, and other values may be determined as the preset length.

The voice signal determiner 1020 according to an exemplary embodiment may determine whether or not the sound signal received by the signal receiver 1010 includes a voice signal. Also, the voice signal determiner 1020 may convert the sound signal received by the signal receiver 1010 into a first frequency domain signal, and analyze the converted first frequency domain signal to determine whether or not the sound signal includes a voice signal.

The sound signal received by the signal receiver 1010 according to an exemplary embodiment may be a time domain signal. The voice signal determiner 1020 according to an exemplary embodiment may convert the sound signal provided as a time domain signal into the first frequency domain signal.

The first frequency domain signal according to an exemplary embodiment may represent a signal having a form expressible in a preset frequency domain. For example, the voice signal determiner 1020 may convert the sound signal which is a time domain signal into a DFT domain signal. In another example, the voice signal determiner 1020 may convert the sound signal which is a time domain signal into a DCT domain signal. In still another example, the voice signal determiner 1020 may convert the sound signal which is a time domain signal into a DST domain signal. In yet another example, the voice signal determiner 1020 may convert the sound signal which is a time domain signal into an MDCT domain signal.

The voice signal determiner 1020 according to an exemplary embodiment may convert the sound signal into a first frequency domain signal in units of preset time lengths.

For example, the voice signal determiner 1020 may convert the sound signal acquired in units of time lengths of about 30 ms into a first frequency domain signal. As an example, the voice signal determiner 1020 may convert a fourth sound signal, which is a sound signal acquired between a point in time at which about 930 ms elapses after the device 100 starts operating and a point in time at which about 960 ms elapses after the device 100 starts operating, into a DFT domain signal. Here, the fourth sound signal may be a time domain signal.

The voice signal determiner 1020 according to another embodiment may determine whether or not the sound signal is a voice signal using the received sound signal. For example, the voice signal determiner 1020 may extract features from the received sound signal and analyze the extracted features to determine whether or not the received sound signal is a voice signal. In another example, the voice signal determiner 1020 may analyze the frequency of the received sound signal to determine whether or not the received sound signal is a voice signal.

The voice signal determiner 1020 according to still another embodiment may convert the sound signal received by the signal receiver 1010 into a first frequency domain signal, and determine whether or not the sound signal is a voice signal using the first frequency domain signal acquired through the conversion. For example, as described above, the voice signal determiner 1020 may convert the received sound signal into a first frequency domain signal, analyze features of the first frequency domain signal acquired through the conversion, and determine whether or not the received sound signal is a voice signal according to an analysis result.

The frequency converter 1030 according to an exemplary embodiment converts the first frequency domain signal into a second frequency domain signal based on the determination of the voice signal determiner 1020.

The frequency converter 1030 according to an exemplary embodiment may convert the first frequency domain signal into a second frequency domain signal. For example, the frequency converter 1030 directly converts the first frequency domain signal into a second frequency domain signal, and thus may process the sound signal in units of short time lengths. As an example, when the first frequency domain signal is directly converted into the second frequency domain signal without an intermediate process of converting the first frequency domain signal into the time domain, the frequency converter 1030 may process the sound signal in units of time lengths of about 0.1 seconds or less. However, the time length of about 0.1 seconds used herein is only an example of the length of a sound signal, and other time lengths may be used. As another example, even when a voice command has a length of about two seconds, the frequency converter 1030 may determine whether or not each of the sound signals obtained by dividing the sound signal having a length of about two seconds in units of time lengths of about 0.05 seconds is a voice signal.

The frequency converter 1030 according to another embodiment may convert the first frequency domain signal into a second frequency domain signal when the sound signal is determined to be a voice signal. For example, the frequency converter 1030 may not convert the first frequency domain signal into a second frequency domain signal when the sound signal has been determined not to be a voice signal by the voice signal determiner 1020 through the analysis of the first frequency domain signal. In another example, the frequency converter 1030 may convert the first frequency domain signal into a second frequency domain signal when the sound signal has been determined to be a voice signal through the analysis of the first frequency domain signal.

The frequency converter 1030 according to still another embodiment may convert the first frequency domain signal into a second frequency domain signal using at least one method among upsampling, downsampling, interpolation, and mirroring.

For example, when the first frequency domain signal is a DFT domain signal and the second frequency domain signal is a DCT domain signal, the frequency converter 1030 may acquire the second frequency domain signal by performing upsampling, interpolation, and phase shifting on the first frequency domain signal. The upsampling, interpolation, and phase shifting may be performed in a way that is adaptable to a domain transform.

In another example, when the first frequency domain signal is a DCT domain signal and the second frequency domain signal is a DFT domain signal, the frequency converter 1030 may acquire the second frequency domain signal by performing downsampling, mirroring, and phase shifting on the first frequency domain signal. The downsampling, mirroring, and phase shifting may be performed in a way that is adaptable to a domain transform.

The voice signal determiner 1020 according to a further embodiment may store the first frequency domain signal in the internal memory 1050 included in the device 100, and the frequency converter 1030 may convert the stored first frequency domain signal into a second frequency domain signal.

For example, the voice signal determiner 1020 may convert the received sound signal into the first frequency domain signal and store the first frequency domain signal in the internal memory 1050 included in the device 100. The data size of the converted first frequency domain signal may be small enough for the first frequency domain signal to be stored in the internal memory 1050. As an example, the voice signal determiner 1020 may convert the sound signal having a preset length into the first frequency domain signal and store the first frequency domain signal in the internal memory 1050 included in the device 100. Here, the preset length according to an exemplary embodiment may be short enough, and the data size of the converted first frequency domain signal may be small enough, for the first frequency domain signal to be stored in the internal memory 1050. For example, the preset length may be about 0.1 seconds or less. Since the device 100 according to an exemplary embodiment may control the data size of the first frequency domain signal to be a preset value or less as described above, it is possible to store the first frequency domain signal in the internal memory 1050 and process the stored first frequency domain signal. Since the frequency converter 1030 may process the first frequency domain signal using the internal memory 1050 alone, it is possible to process the first frequency domain signal without accessing an external memory.

In another example, the frequency converter 1030 may acquire a second frequency domain signal by performing a frequency conversion on the first frequency domain signal stored in the internal memory 1050. The frequency converter 1030 according to an exemplary embodiment may perform a frequency conversion on a signal stored in a memory. Therefore, in order for the frequency converter 1030 to perform the frequency conversion, the first frequency domain signal may be stored in advance. The frequency converter 1030 may acquire a second frequency domain signal by performing a frequency conversion on the first frequency domain signal stored in the internal memory 1050.

The voice signal determiner 1020 according to a still further embodiment may perform noise filtering on the first frequency domain signal, and convert the noise-filtered signal into a second frequency domain.

For example, the voice signal determiner 1020 may convert the sound signal into the first frequency domain signal, perform noise filtering on the first frequency domain signal acquired through the conversion, and perform a frequency conversion on the noise-filtered signal, thereby acquiring a second frequency domain signal. Since the noise filtering is performed on the first frequency domain signal, a noise filtering method suitable for the first frequency domain signal may be used.

The second frequency domain signal according to an exemplary embodiment may represent a signal having a form expressible in a preset frequency domain. For example, the frequency converter 1030 may convert the first frequency domain signal into a DFT domain signal. In another example, the frequency converter 1030 may convert the first frequency domain signal into a DCT domain signal. In still another example, the frequency converter 1030 may convert the first frequency domain signal into a DST domain signal. In yet another example, the frequency converter 1030 may convert the first frequency domain signal into an MDCT domain signal.

The amount of calculation necessary to convert the first frequency domain signal into a second frequency domain signal may be smaller than the amount of calculation necessary to convert the first frequency domain signal into a time domain signal and then acquire a second frequency domain signal from the time domain signal. Therefore, by directly converting the first frequency domain signal into a second frequency domain signal, the frequency converter 1030 may reduce the necessary amount of calculation.

The signal recognizer 1040 according to an exemplary embodiment recognizes the sound signal received by the signal receiver 1010 using the second frequency domain signal acquired through the conversion.

The signal recognizer 1040 according to an exemplary embodiment may extract features of the second frequency domain signal by analyzing the second frequency domain signal, thereby recognizing a voice signal from the second frequency domain signal. The voice signal recognized from the second frequency domain signal may be a voice signal corresponding to the sound signal received by the signal receiver 1010.

For example, when the sound signal received by the signal receiver 1010 is determined to be a voice signal by the voice signal determiner 1020, the signal recognizer 1040 may recognize the voice signal by extracting features of the second frequency domain signal. When the signal recognizer 1040 according to an exemplary embodiment performs a voice recognition operation, the signal recognizer 1040 may use a voice database. The voice database may represent a database in which data related to features of voice are collected. The signal recognizer 1040 according to an exemplary embodiment may recognize a voice signal corresponding to a sound signal by comparing the features of voice stored in the voice database with the analysis results of the second frequency domain signal. For example, when the sound signal is a voice signal corresponding to "Set my alarm," the signal recognizer 1040 may determine that features of the voice signal data "my alarm" stored in the voice database and features of the voice signal data "set" correspond to features of the received sound signal, and may recognize that the received sound signal corresponds to a voice signal "Set my alarm." Also, the signal recognizer 1040 may transmit the voice recognition result to a receiver external to the device 100.

The above-described apparatus and method for processing a sound signal according to a variety of exemplary embodiments may be recorded in a computer-readable recording medium and performed by a computer, so that the above-described functions may be performed.

Examples of the computer-readable recording medium storing a program as described above include a ROM, a RAM, a CD-ROM, a magnetic tape, a floppy disk, an optical media storage, and so on.

The computer-readable recording medium may also be distributed over network-coupled computer systems so that the computer-readable code is stored and executed in a distributed manner. In this case, at least one selected from a plurality of distributed computers may perform some of the above-described functions and transmit results of the performance to at least one other from among the plurality of distributed computers, and another computer receiving the results may also perform some of the above-described functions and provide results of the performance to other distributed computers.

In a method of processing a sound signal according to a variety of exemplary embodiments, a conversion of a sound signal is efficiently processed, so that a device may be simplified and operated with low power.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of processing a sound signal, the method comprising:
   receiving, by a device, a sound signal from an external source;
   converting the sound signal into a first frequency domain signal in a first frequency domain, and determining whether or not the sound signal is a voice signal using the first frequency domain signal;
   converting the first frequency domain signal into a second frequency domain signal in a second frequency domain based on a result of the determining; and
   analyzing the sound signal using the second frequency domain signal.

2. The method of claim 1, wherein the converting the first frequency domain signal into the second frequency domain signal based on the result of the determining comprises determining that the sound signal is a voice signal.

3. The method of claim 1, wherein the converting the first frequency domain signal into the second frequency domain signal based on the result of the determining comprises using at least one method selected from upsampling, downsampling, interpolation, mirroring, and phase shifting.

4. The method of claim 1, wherein the first frequency domain includes at least one selected from a discrete Fourier transform (DFT) domain, a discrete cosine transform (DCT) domain, a discrete sine transform (DST) domain, and a modified discrete cosine transform (MDCT) domain.

5. The method of claim 1, wherein the second frequency domain includes at least one selected from a discrete Fourier transform (DFT) domain, a discrete cosine transform (DCT) domain, a discrete sine transform (DST) domain, and a modified discrete cosine transform (MDCT) domain.

6. The method of claim 1, wherein the converting the first frequency domain signal into the second frequency domain signal based on the result of the determining comprises:
   storing the first frequency domain signal in an internal memory included in the device; and
   converting the stored first frequency domain signal into the second frequency domain signal.

7. The method of claim 1, wherein the converting the first frequency domain signal into the second frequency domain signal based on the result of the determining comprises:
   performing noise filtering on the first frequency domain signal; and
   converting the noise-filtered first frequency domain signal into the second frequency domain.

8. The method of claim 1, wherein the analyzing the sound signal using the second frequency domain signal comprises using an external memory located outside of the device.

9. A device comprising:
   a signal receiver configured to receive a sound signal from an external sound source;
   a voice signal determiner configured to convert the sound signal into a first frequency domain signal in a first frequency domain, and determine whether or not the sound signal is a voice signal using the first frequency domain signal;
   a frequency converter configured to convert the first frequency domain signal into a second frequency domain signal in a second frequency domain based on a result of the determining; and
   a signal recognizer configured to analyze the sound signal using the second frequency domain signal.

10. The device of claim 9, wherein the frequency converter is further configured to convert the first frequency domain signal into the second frequency domain signal when the voice signal determiner determines that the sound signal is a voice signal.

11. The device of claim 9, wherein the frequency converter is further configured to convert the first frequency domain signal into the second frequency domain signal using at least one method selected from upsampling, downsampling, interpolation, mirroring, and phase shifting.

12. The device of claim 9, wherein the first frequency domain includes at least one selected from a discrete Fourier transform (DFT) domain, a discrete cosine transform (DCT) domain, a discrete sine transform (DST) domain, and a modified discrete cosine transform (MDCT) domain.

13. The device of claim 9, wherein the second frequency domain includes at least one selected from a discrete Fourier transform (DFT) domain, a discrete cosine transform (DCT) domain, a discrete sine transform (DST) domain, and a modified discrete cosine transform (MDCT) domain.

14. The device of claim 9, wherein the frequency converter is further configured to store the first frequency domain signal in an internal memory included in the device, and convert the stored first frequency domain signal into the second frequency domain signal.

15. The device of claim 9, wherein the frequency converter is further configured to perform noise filtering on the first frequency domain signal, and convert the noise-filtered first frequency domain signal into the second frequency domain.

16. The device of claim 9, wherein the signal recognizer is further configured to use an external memory located outside of the device.

17. A non-transitory computer-readable recording medium storing a program for implementing the method of claim 1.

18. The method of claim 1, wherein the analyzing the sound signal using the second frequency domain signal comprises:
- extracting features from the second frequency domain signal;
- comparing the extracted features from the second frequency domain signal with a vocal database; and
- transmitting a voice recognition result based on a result of the comparing.

19. The method of claim 1, wherein the converting the first frequency domain signal into the second frequency domain signal comprises converting the first frequency domain signal directly into the second frequency domain signal without an intermediate process of converting the first frequency domain signal into a time domain signal.

20. The method of claim 1, wherein:
- the converting the sound signal into the first frequency domain signal comprises converting the sound signal into the first frequency domain signal in units of a first preset time length,
- the converting the first frequency domain signal into the second frequency domain signal comprises converting the first frequency domain signal into the second frequency domain signal in units of a second preset time length, and
- the second preset time length is shorter than the first preset time length.

* * * * *